Jan. 3, 1961 L. D. SOUBIER 2,966,702
METHOD OF AND APPARATUS FOR MAKING PLASTIC ARTICLES
Filed Oct. 3, 1958 6 Sheets-Sheet 6
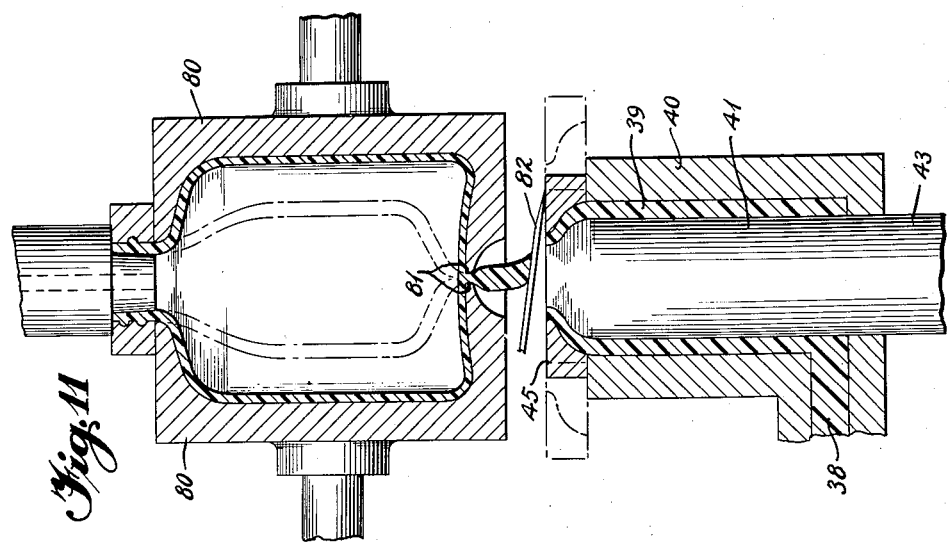
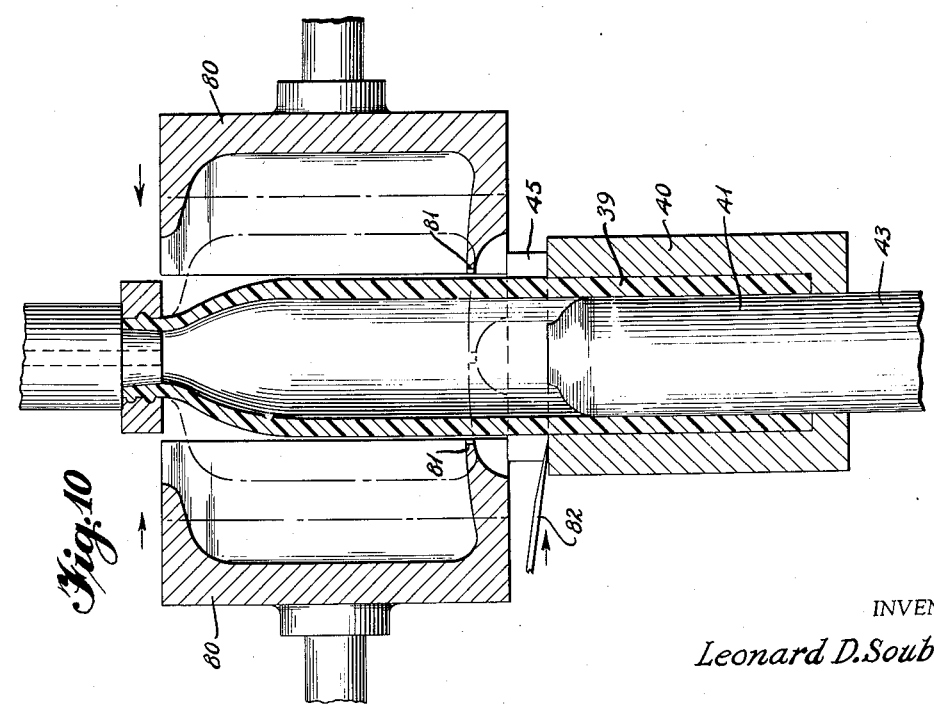
INVENTOR
Leonard D. Soubier
BY
Mead, Browne, Schuyler & Beveridge
ATTORNEYS

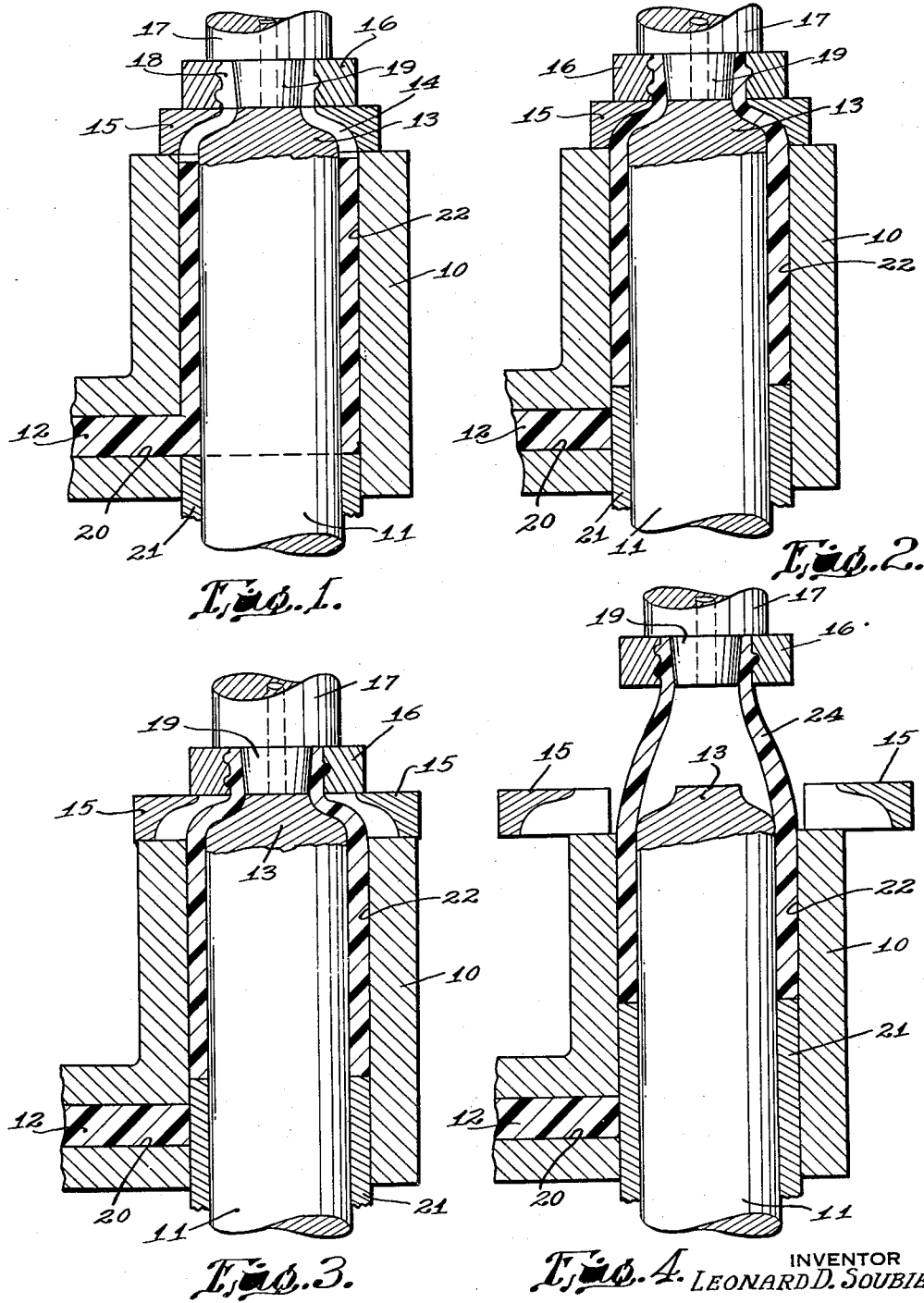

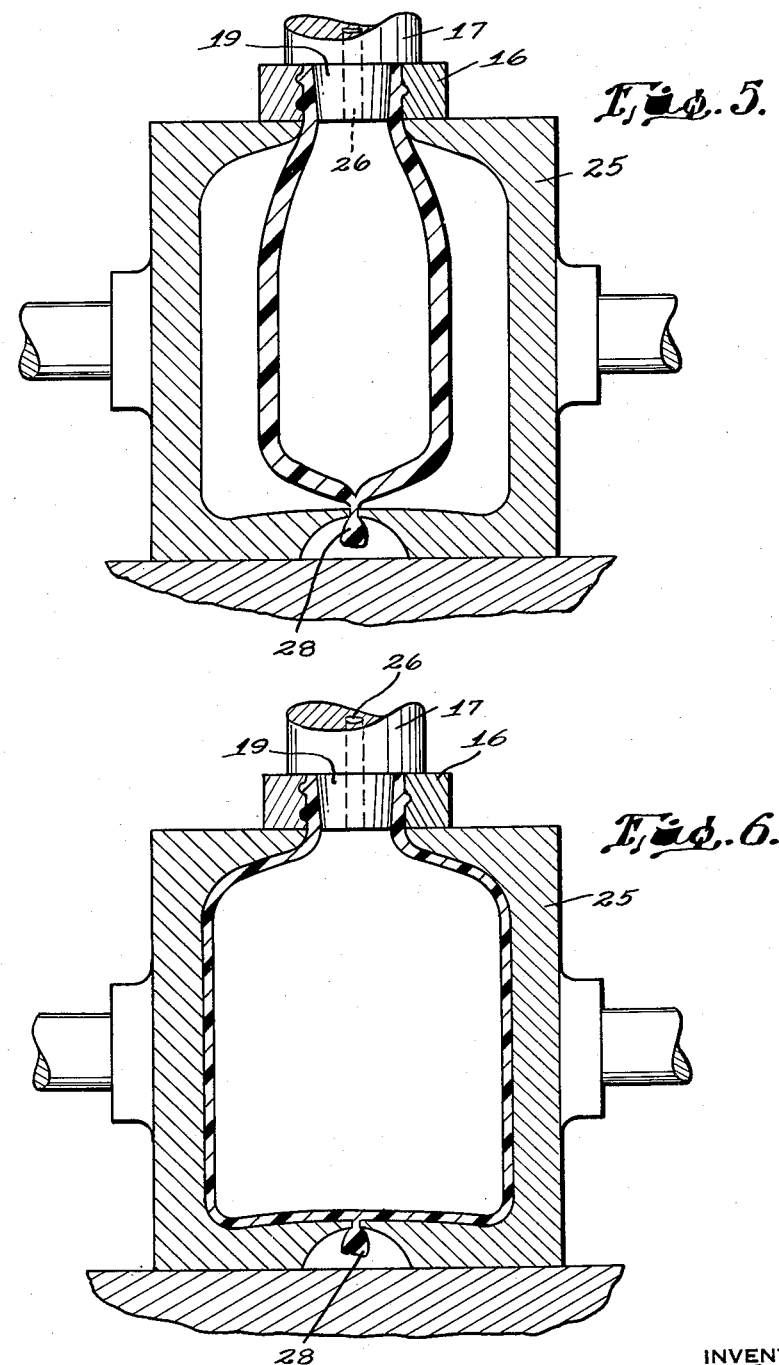

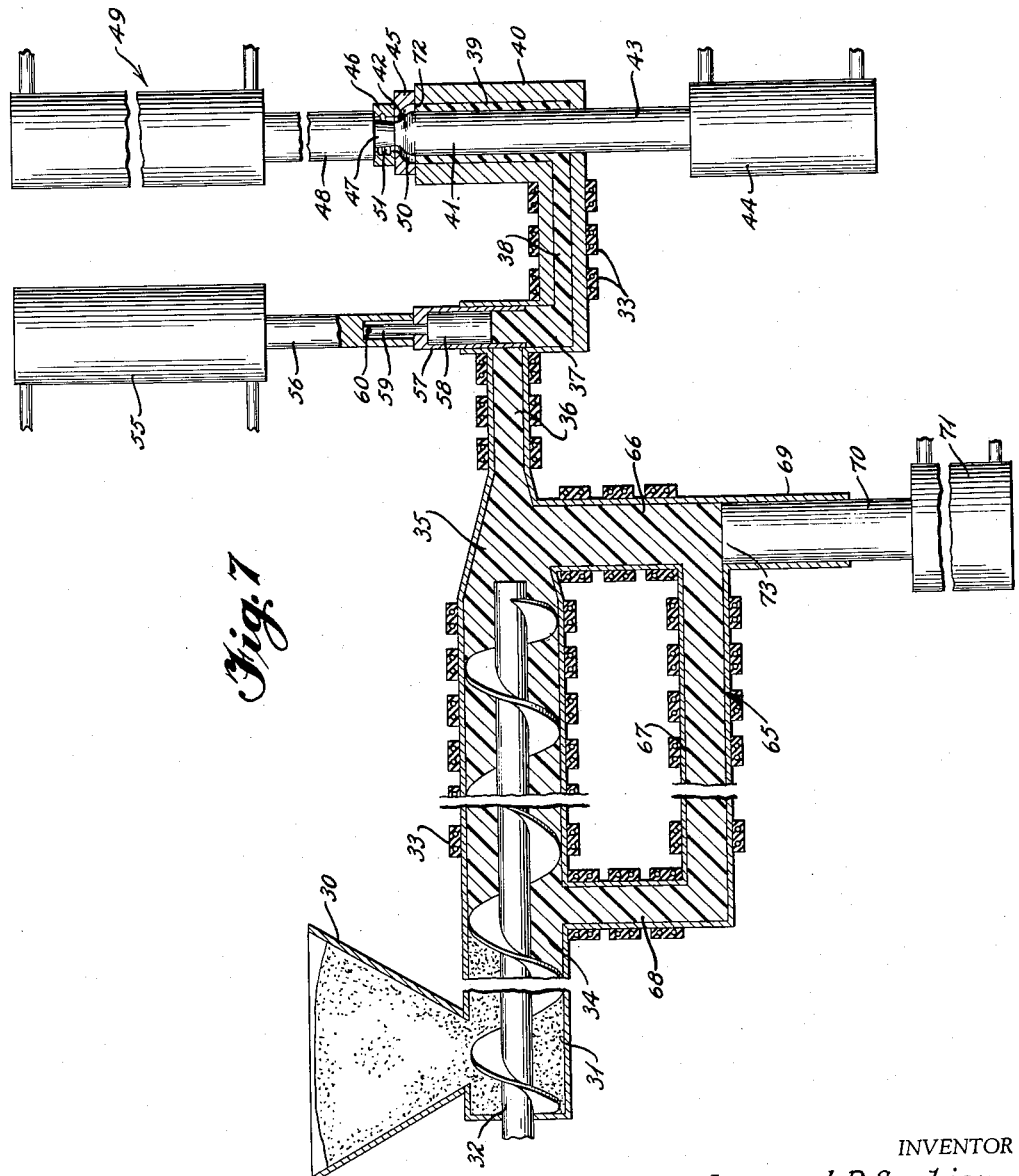

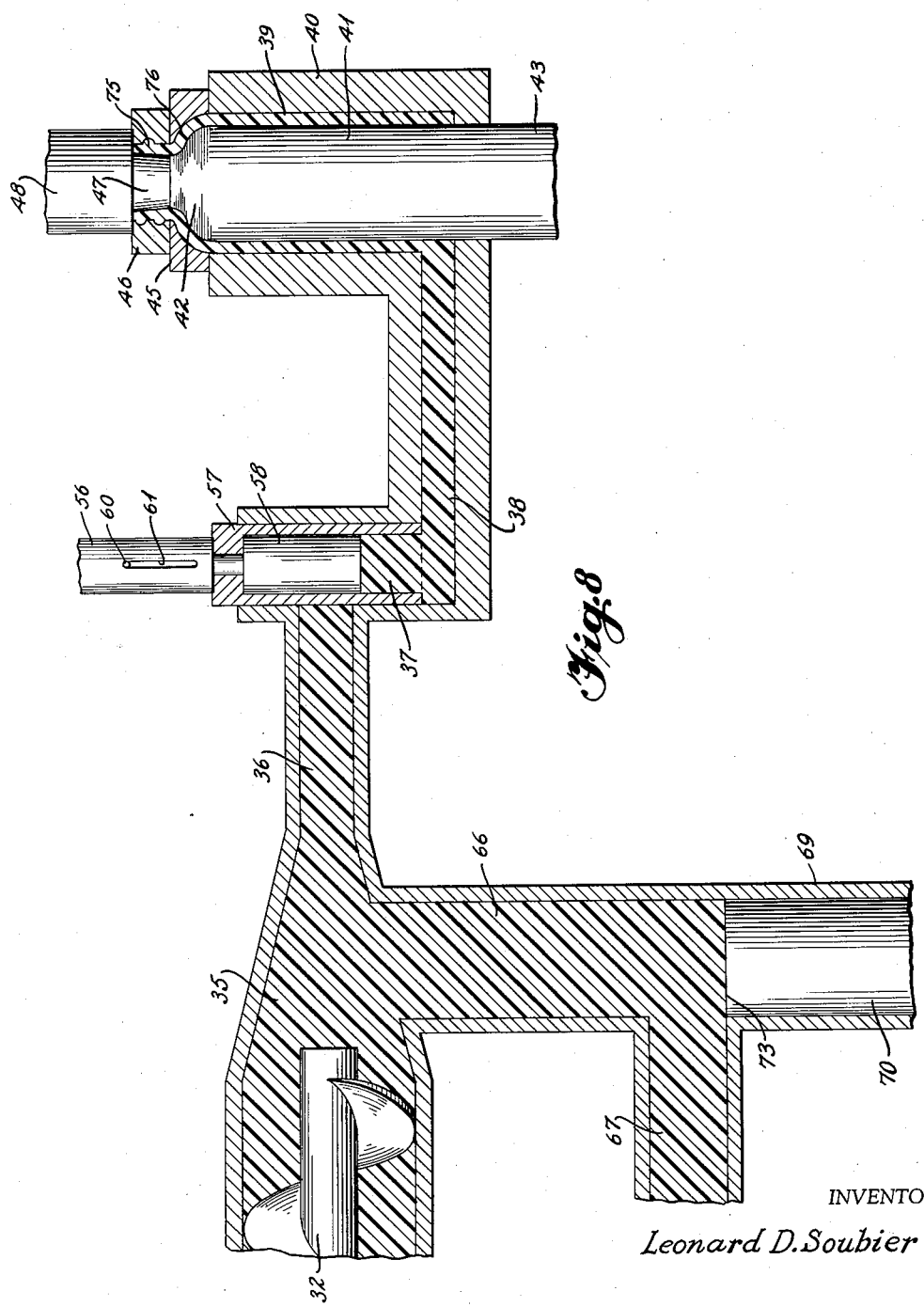

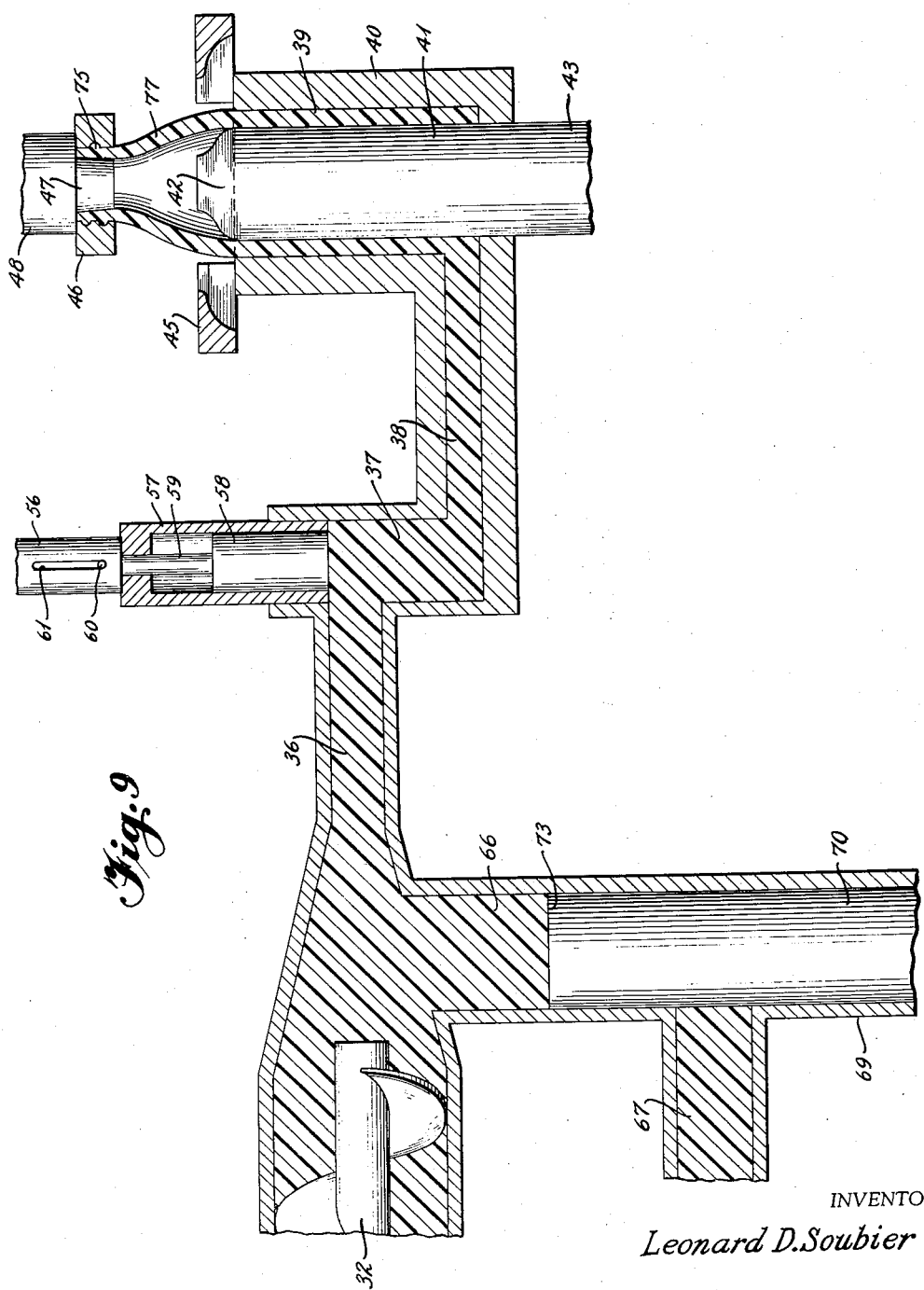

2,966,702
Patented Jan. 3, 1961

2,966,702

METHOD OF AND APPARATUS FOR MAKING PLASTIC ARTICLES

Leonard D. Soubier, Toledo, Ohio, assignor to Owens-Illinois Glass Company, a corporation of Ohio Filed Oct. 3, 1958, Ser. No. 765,720

9 Claims. (Cl. 18—55)

The present invention relates to methods of and apparatus for making hollow plastic articles, such as containers, by combined injection molding, extruding, and blowing techniques.

This application is a continuation-in-part of my earlier filed pending application Serial No. 518,491, filed June 28, 1955, and of my earlier filed application Serial No. 698,774, filed November 25, 1957, now abandonded.

In Patent No. 2,804,654, issued to Orville B. Sherman and assigned to the assignee of the present invention, there is disclosed a method of forming hollow plastic articles, such as containers by a combined injection molding, extrusion, and blowing technique. By practicing the method set forth in the patent, it is possible to manufacture bottles, jars, or the like of thermoplastic materials having restricted necks or finishes and enlarged body portions. However, it has been found that the size of containers manufacturable in accordance with the techniques taught in Patent No. 2,804,654 is restricted by the degree of expansion possible in the extruded tubular extension formed integrally with the molded neck or finish. In the manufacture of large ware, such as quart or one-half gallon containers, it is impossible to expand the tube sufficiently if the tube were formed with substantially the same diameter as the finish, as proposed in said patent.

By the methods and apparatus of the present invention, it is possible to form such relatively large ware by the concurrent injection molding of the finish and shoulders or joining portions of the container. The molded joining portions slope outwardly from the restricted neck for juncture with the latter extruded tube. Thus, the tube diameter can be substantially greater than the diameter of the finish, with the larger diameter tube providing the material necessary to permit the blowing of the tube to a final container relatively large with respect to the finish. Conversely, it is also possible to form ware having an enlarged neck or finish and a reduced body.

Preferably, the shoulder or joining portion, which is integrally injection molded with the finish, is merely transitory and is later expanded during the tube blowing operation to form a portion of the final container. Thus, the present invention proposes the injection molding of the container finish and an integral, transitory joining portion, the extrusion of a tubular extension integral with the transitory portion, and finally the blowing of the transitory portion and the tube into a final finished container shape.

To accomplish the injection molding of the transitory portion, the apparatus of the invention preferably includes a separable shoulder mold interposed between the finish mold and the extrusion orifice, the shoulder mold being separable to accommodate the extrusion of the relatively large tube from the orifice. Inasmuch as the shoulder mold portions of the apparatus taper from the relatively small finish or neck mold to the radially enlarged extrusion orifice, the separable shoulder mold serves to transmit plastic material under injection pressures to the finish mold without hindering the later extrusion of the tubular extension.

It is, therefore, an important object of the present invention to provide a novel apparatus and method for the formation of plastic containers having restricted neck portions and an enlarged body portion joined by a flaring joining portion formed integrally therewith and blown to final configuration.

Another important object of this invention is the provision of an improved plastic article forming method involving the simultaneous injection molding of a finished portion of the article and a transitory portion immediately adjacent the finished portion, the extrusion of a tubular extension integral with the transitory portion, and the final expansion of both the transitory portion and the tubular portion to the configuration of the final article.

It is a further object of this invention to provide a novel apparatus for the making of plastic articles and including an injection mold for forming a finished portion of the article, an anular extrusion orifice of greater diameter than the finished article portion, a separable injection mold bridging the gap between the orifice and the finish portion injection mold and a blow mold adapted to enclose material issued from the extrusion orifice and including the portion originally molded in said separable mold.

It is yet another important object of this invention to provide an improved method for the making of a plastic container by joining the molded finish portion and an angular extrusion orifice of different diameters with a tapered molded shoulder portion, extruding from the orifice a tubular formation integral with the shoulder portion, and blowing both the shoulder portion and the tubular formation to the shape of the finished container.

Other objects and advantages of the invention will appear from the following detailed description taken in conjunction with the annexed drawings.

As shown on the drawings:

Figure 1 is a vertical sectional view with parts shown in elevation, illustrating a portion of the apparatus and method of the present invention;

Figures 2, 3 and 4 are views similar to Figure 1 and illustrating successive steps in the method;

Figure 5 is a sectional view, with parts shown in elevation, illustrating the positioning of an injection molded and extruded blank in a blowing mold;

Figure 6 is a view similar to Figure 5 illustrating the blank blown to its final configuration;

Figure 7 is a schematic view illustrating a modified form of apparatus capable of carrying out the method of the present invention;

Figure 8 is a view similar to Figure 7 illustrating a successive step in the method;

Figure 9 is a view similar to Figures 7 and 8 illustrating another consecutive step in the method;

Figure 10 is a sectional view, with parts shown in elevation, illustrating the positioning of blowing molds about the blank just prior to blowing of the blank to its final configuration; and Figure 11 is a view similar to Figure 10 illustrating a modified method of positioning the blowing molds, severing the blank from the blank forming apparatus and blowing the container to its final configuration.

As shown on the drawings:

In Figure 1, reference numeral 10 refers generally to a cylindrical wall forming a part of a molding head concentric with a central core 11 and spaced radially about the core 11 to provide a tubular extrusion cavity or chamber 22 into which heated and plasticized thermoplastic material 12 is introduced through conduit 20. The core 11 and the wall 10 cooperate to define an annular orifice therebetween, this orifice communicating fully with the cavity 22.

The upper terminal portion 13 of the core 11 has its wall surface curved and tapered radially inwardly and upward to form the inner wall surface of a shoulder cavity 14. A partible or separable shoulder mold, defined by mold sections 15, is shaped to define the outer surface of the shoulder cavity 14. The shoulder cavity, defined by the upper portion of the core and the partible shoulder mold sections 15, provides a tapered passage 14 communicating with the interior of an upper neck or finish mold 16. This mold 16, comprising partible sections, cooperates with a central finish core 19 to define a finish mold cavity 18 forming an extension of the shoulder mold cavity 14. The neck or finish mold 16 is carried by a plunger or hydraulic cylinder actuating rod 17 by means of which the neck mold may be withdrawn upwardly, as illustrated in Figure 4.

The molding material 12, which may be either a thermoplastic or a thermosetting material, is forced through the conduit 20 into the molding chamber 22 provided intermediate the head 10 and the core 11. The head 10 is adapted to maintain the moldable material at a temperature conducive to subsequent molding and shaping. The heated material is supplied to the conduit 20 by suitable means, as by a plasticizing extruder hereinafter described in connection with Figures 7-9.

As shown in Figure 1, a sufficient amount of the material is introduced into the passage 22 to fill the extrusion chamber up to about the shoulder mold 15. This is the normal or at rest position of the apparatus.

A tubular plunger or sleeve-type piston 21, conforming in size and shape to the mold cavity, is movable up and down in the extrusion chamber 22. During the extrusion of the plastic into this chamber, the sleeve 21 is held stationary with its upper end at or below the bottom of the conduit 20. When a sufficient amount of the material has been introduced into the mold cavity 22, for example, as shown in Figure 1, the sleeve 21 is moved upward, thereby simultaneously cutting off communication of the conduit 20 with the chamber 22 and forcing the plastic bodily upward as shown in Figure 2, thus filling the shoulder and neck mold cavities 14, 18 under injection molding pressure and forming a hollow blank or parison with a neck of substantially less diameter than the body thereof and with an intermediate tapered shoulder portion in the shoulder cavity 14 interconnecting the neck and the body portions.

Next, the shoulder mold sections 15 are withdrawn laterally away from the core 11, as illustrated in Figure 3, the separable shoulder mold thus exposing those portions injection molded in the shoulder cavity 14 and interconnecting the molded finish portion in the cavity 18 and the annular orifice defined at the end of the extrusion cavity 22.

After the partible shoulder mold sections 15 have been withdrawn, the plunger 17 is again actuated to move the neck mold 16 and the plunger 17 upwardly relatively to the body mold 10. The sleeve-piston 21 is concurrently actuated upwardly to extrude from the extrusion chamber 22 a tubular extension 24 integral with the injection mold finish and shoulder portions. Preferably, the neck mold 16 and its plunger 17 are moved upwardly either a greater distance than the sleeve 21 or at a higher speed, thereby stretching the injection molded shoulder portions 24 of the blank if such stretching is desired. It will be noted from Figure 4 that the contour of the injection molded shoulders is changed during movement of the blank and these injection molded portions now serve to join the upper injected mold finish to the lower extruded tubular formation.

Through the continued upward movement of the neck mold 16, and the concurrent upward movement of the sleeve piston 21, the blank or parison is completely removed from the molding chamber 22 to a position at which it can be enclosed within a finishing mold 26 (Figures 5 and 6.) The finishing mold suitably comprises partible sections movable horizontally to and from closed position at which the partible sections completely enclose the tubular formation and injection molded shoulders and the movement of the finishing mold sections effects engagement of the sections with the lower end portion of the blank to thus close the bottom end of the blank. The blank is then blown to its final form by air pressure supplied through a vertical passage 26 extending axially through the plunger 17 and the finish core 19 to expand the blank to its final finished form, as illustrated in Figure 6 of the drawings. The neck mold, finishing mold sections, and the neck mold plunger may then be withdrawn and the finished container removed. The moil 28, formed by closure of the finishing mold sections about the blank, may be removed by twisting, severing or any other desired method.

In the modified form of the invention illustrated in Figures 7-9, inclusive, the preferred thermoplastic material, in the form of pellets, is introduced into a supply hopper 30 communicating at its lower end with a horizontally disposed, generally cylindrical plasticizing chamber 31 within which is disposed a co-axial, axially extending plasticizing and extruding screw 32. The screw is power driven (by means not shown) for rotation about its longitudinal axis and the lead of the screw 32 feeds the granulated or pelletized thermoplastic material through the plasticizing chamber 31. The plasticizing chamber is surrounded by suitable heating elements, such as electric heating coils 33, and the combination of heat, supplied by the heaters 33, and pressure, supplied by the helical screw thread, is sufficient to reduce the pelletized thermoplastic material to a fluid state by the time the material has traveled to a medial portion 34 of the chamber 31.

Thermoplastic material in a fluid state issuing from the extruder and plasticizing screw 32 is conducted through a tapered outlet portion 35 and a longitudinal conduit 36 through a vertical conduit portion 37 communicating through a longitudinal passage 38 to a vertical tubular extrusion chamber 39 cooperatively defined by an exterior cylindrical chamber wall 40 and an interior core 41 having a tapered upper portion 42 and connected, as through actuating rod 43, to a double acting fluid pressure cylinder or motor 44.

Superimposed over the cylindrical wall 40 and radially aligned with the reduced portion 42 of the core 41 is a partible or separable shoulder mold 45 and superimposed on the shoulder mold, when in its closed position of Figure 7, is a neck or finish mold 46 having a central core 47, the mold 46 and the core 47 being carried by the actuating rod 48 of an upper fluid pressure actuated cylinder 49.

It will be appreciated that the tapered portion 42 of the core 41 and the shoulder molds 45 cooperatively define therebetween a shoulder mold cavity 50 of upwardly and inwardly tapered configuration and serving to join the extrusion cavity 39 with a finish cavity 51 of lesser diameter.

In alignment with the vertical conduit portion 37 is a fluid pressure actuated cylinder or motor 55 the depending actuating rod 56 of which carries at its lower end a depending tubular sleeve valve 57 insertable into the vertical conduit 37, as illustrated in Figure 7, when the motor 55 is actuated to extend the actuating rod 56 downwardly. Slidably disposed interiorly of the sleeve valve 57 is a cylindrical injection piston 58 having a reduced actuating stem 59 slidably connected, as by a transverse pin 60 and a slot 61 in the actuating rod 56 (Figure 8), with the actuating rod. This lost motion between the sleeve valve 57 and the actuating piston 58 permits the initial insertion of the sleeve valve into the passage 37 to interrupt communication between the passage 37 and the longitudinal conduit 36, followed by the later insertion of the injection piston 58 into the vertical passage 37 for a purpose to be hereinafter more fully described.

The tapered extruder outlet 35 communicates with a recirculation passage indicated generally at 65 and comprising a vertical conduit 66 communicating directly with the tapered portion 35, a horizontal conduit portion 67 and a second vertical conduit portion 68 communicating with the medial portion 34 of the extrusion chamber 31 at a point at which the pelletized plastic material introduced into the extrusion chamber has been reduced to fluid state.

Disposed in a vetrical extension 69 of the vertical recirculation conduit 66 is a combination recirculation and extrusion piston 70 adapted for actuation upwardly into the conduit portion 66 by a single acting fluid pressure actuated cylinder 71.

The apparatus of Figures 7, 8 and 9 is illustrated in three successive operational positions. In Figure 7, the apparatus is illustrated in its at rest position in which the level of thermoplastic material in the extrusion chamber 39 is substantially that of the extrusion orifice 72 and the apparatus is substantialy full of material with the valve sleeve 57 being in its actuated or dependent position interrupting communication between the plasticizing chamber 31 and the extrusion chamber 39. Due to rotation of the combined plasticizer and extruder screw 32, substantial pressures will be generated within the conduit portions 35 and 36, which pressures will be effective upon the end face 73 of the piston 70 to depress the piston to its non-actuated position, illustrated in Figure 7. Consequently, the material delivered by the screw 32 will be recirculated through the recirculation passage 65, comprising conduit portions 66, 67 and 68, and a continuous recirculatory flow of fluid plasticized material will result. The entry of the recirculated material into the medial portion 34 of the plasticizing chamber 31 will hold back the oncoming flow of particulated materials from the hopper 30, the particulated materials sliding upon the helical screw thread and the pressure of already fluid, plasticized material recirculating through the passage 65 preventing the feeding of fresh particulated material by the screw.

In the at-rest position, the cylinder 44 is actuated to its uppermost position, so that the tapered portion 42 of the extrusion chamber core 41 cooperates with the partible shoulder mold sections 45 to define the tapered shoulder cavity 50 joining the annular extrusion orifice 72 and the finish cavity 51. Further, the cylinder 49 is actuated to its lower position to maintain the finish core 47 and finish mold 46 in firm abutment with the core 41 and the shoulder mold 45, respectively.

Next, the cylinder 55 is actuated further downwardly to depress the actuating rod 56, forcing the injection piston 58 downwardly within the sleeve valve 57, thereby displacing some of the material strapped by the sleeve valve in the conduit 37 through the passage 38 and the extrusion chamber 39 into the shoulder mold cavity 50 and the neck mold cavity 51 under injection molding pressure. This condition is illustrated in Figure 8 of the drawings, in which it will be seen that material filling the finish cavity will define the desired container finish 75 and the finish 75 will be joined to material occupying the extrusion chamber 39 through a tapered shoulder portion 76 filling the shoulder cavity 50.

At this stage of the operation, the pressure exerted upon material in the vertical passage 37 by the injection piston 58 has injected molded the finish portion 75 and the shoulder portion 76.

Immediately following this operation of Figure 8, the cylinder 55 is actuated vertically upwardly, withdrawing both the sleeve valve 57 and the injection piston 58, thus re-establishing communication between the plasticizing chamber 31 and the extrusion chamber 39 and establishing the full communication of fluid plasticized material from the outlet end of the plasticizing and extruding screw 32 to the annular orifice 72 of the extrusion chamber 39. Simultaneously, the partible shoulder mold sections 45 are laterally withdrawn to expose completely the extrusion orifice. At this time, the cylinder 71 is preferably actuated to displace the extrusion piston vertically upwardly into the conduit portion 66.

Upon the establishment of communication between the plasticizing and extruding screw and the extrusion chamber 39 and upon upward actuation of the extrusion piston 70, material under pressure will be extruded through the interconnecting passages and conduits 35, 36, 37 and 38 into the extrusion chamber 37 and hence through the open annular extrusion orifice 72 in an upward direction. The resultant extruded formation will be tubular, although not necessarily cylindrical, and this tubular formation will be integral with the previously injection molded finish 75 and shoulders 76. Preferably, although not necessarily, the neck mold and finish portion 75 combined thereby are moved outwardly through a greater distance than the length of the extruded tubular formation or the neck mold and the finish portion 75 are moved upwardly at a greater speed than the speed of extrusion, thereby stretching the shoulder portion 76 previously injection molded. At the time of opening of the shoulder mold 45, the injected shoulder portions 76 have not set to a final configuration and are easily deformable and are stretchable to a smoothly contoured tapered configuration, illustrated in Figures 9 and 10, thereby bridging the gap between the extrusion orifice and the finish 75.

After the injection molded finish has been moved vertically to an extent sufficient to extrude a tube of the desired length, actuation of the piston 49 ceases and the piston 55 is actuated downwardly to again insert the tubular valve or sleeve valve 57 into the vertical passage 37 interrupting communication between the tapered passage 35 and the extrusion chamber 39. Continued operation of the combined plasticizer and extruder screw 32 builds up pressure in the chamber 35 and the passage 36, which pressure will be exerted upon the upper face 73 of the piston 70 and will actuate the piston 70 downwardly to its position of Figure 7 after upward actuation of the cylinder 71 has ceased.

Following the extrusion of a sufficient length of tubular formation 77, as illustrated in Figure 10 of the drawings, the cylinder 44 for the core 41 is actuated downwardly to drop the core to a point at which the upper extent of the tapered portion 42 thereof is level with or below the extrusion orifice 72. Concurrently, partible blow mold sections 80 are moved transversely inwardly to engage the tubular extension 77 closely adjacent the extrusion orifice, contact between the molds and the tubular extension pinching lower portions of the tubular extension together, thereby sealing the same as at 81.

Next, a transversely operating shear blade or knife 82 is reciprocated across the extrusion orifice and the depressed core 41 to shear the extruded tubular formation at the orifice 72.

Following the sealing of the tubular formation and the shearing of the tubular formation from the material occupying the extrusion chamber 39, the tapered shoulder portion 76 and tubular formation 77 are blown to the final container configuration against the interior walls of the blow mold sections 80 by suitable means, as by air introduced through an air passage extending axially through the finish core 47. During or after the blowing operation, the cylinder 44 is actuated to raise the core 41 to its position of Figure 7 at which the tapered portion 42 of the core projects axially upwardly beyond the annular extrusion orifice 72.

Upon the removal of the blow molds 80, the return of the shoulder molds 45 to their position of Figure 7 and the actuation of the cylinder 49 to lower the finish mold 46 and core 47 to their positions of Figure 7, the machine is ready for the next operating cycle.

In that embodiment of the invention illustrated in Figure 11, the device is substantially the same as illustrated in Figures 7 through 9, inclusive, with the exception that the core cylinder 44 and piston 43 have been eliminated, the core 41 is stationary, and the shoulder mold sections 45 are returned to their inwardly adjusted position prior to the severing of the tubular formation 77. Thus it will be seen that the severance occurs above the tapered portion 42 of the core 41, and the shoulder recesses 50 remain filled with plastic during the blowing operation.

During the initial injection molding of the finish and the shoulders, that portion of the plastic material filling the shoulder recesses 50 is injected therefrom into the finish and new material is injection molded into the shoulder cavity 50.

Thus, it will be seen that the present invention provides a new novel method for the manufacture of plastic articles by a combined injection molding, extruding, and blowing procedure in which a finished portion of the article (for example the neck 75 of the container) is injection molded, together with a transitory portion of the article (such as the shoulder portion 76). This shoulder portion is transitory to the extent that it is not a finished portion of the article, but rather defines a molded portion which is subsequently blown to its final configuration.

By so injection molding the transitory shoulder portion, it becomes possible to manufacture articles in which the finished portion is of a dimension substantially different from the the dimension of the extrusion orifice. For example, large containers may be conveniently blown from a tubular formation larger than an injection molded finish and joined to the finish through a tapered transitory injection molded portion. Conversely, a radially enlarged finish 76 may be joined to a radially reduced tubular formation 77 through an inwardly tapered transitory injection molded portion 76 by utilizing substantially the techniques heretofore disclosed.

While preferred embodiments have been described above in detail, it will be understood that numerous modifications might be resorted to without departing from the scope of the invention as defined in the following claims.

I claim:

1. The method of forming a hollow article which comprises forcing plastic material from a source of supply into an accumulating chamber having outer and inner walls spaced to provide a tubular cavity, thereby forming a tubular body of the plastic material, cutting off the tubular body from the source of supply and moving said cut-off body as a whole in the direction of its length, and during said movement forming an end portion of said body into a neck and an intermediate shoulder portion between the neck and body of the article, including stretching of the said molded material between the body and neck portion thereof after said body is cut off from the said source of supply and thereby elongating the shoulder portion.

2. The method of forming a hollow article which comprises forcing plastic material from a source of supply into an accumulator chamber having outer and inner walls spaced to provide a tubular cavity having an opening at one end, thereby providing a tubular body of the plastic material, cutting off the tubular body from the source of supply and moving said cut-off body as a whole in the direction of its length and through said opening, and during said movement forming an end portion of said body into a neck and an intermediate shoulder portion between the neck and said tubular body, including stretching of the said shoulder material between the tubular body and the neck portion thereof after said body is cut off from the source of supply and while the major portion of said body is retained in said tubular cavity.

3. In a method of making a plastic container from plasticized plastic material, the steps of superimposing a finish injection mold and a separable shoulder injection mold over an annular orifice, ejecting through said orifice and into said injection molds a measured quantity of plasticized material to mold integral shoulder and finish portions, separating said shoulder mold prior to final setting of the shoulder portion, extruding through said orifice a tubular formation integral with said shoulder portion and joined thereby to said molded finish portion, enclosing said shoulder portion and said tubular formation in a blow mold, and concurrently blowing said shoulder portion and said tubular formation outwardly into contact with said blow mold to form a finished container.

4. In a method of making a plastic container from plasticized material, the steps of interposing between the finish injection mold and an annular orifice of different diameters a shoulder injection mold having separable sections defining a tapered open-ended interior cavity mating at one end with the finish mold and at the other end with the annular orifice respectively, ejecting through said orifice and into said injection molds a measured quantity of plasticized material to mold concurrently integral shoulder and finish portions, separating the shoulder mold prior to final setting of the molded shoulders, extruding through said orifice plastic material in the form of a tubular formation integral with said shoulder portion and joined thereby to said molded finish portion, and blowing said shoulder portion and said tubular formation to a finished form.

5. In a method of making a plastic container from plasticized material, the steps of forming a molded finish portion immediately adjacent an annular extrusion orifice of different diameter by forcing material into and through an annular channel joining said portion and said orifice, only partially chilling the material in said channel to form a tapered molded shoulder portion integral with said finished portion, extruding through said orifice a tubular formation integral with said shoulder portion, enclosing both said partially chilled shoulder portion and said tubular formation in a blow mold and blowing said shoulder portion and said tubular formation outwardly into contact with said blow mold to form a finished container.

6. In a method of making a plastic container from plasticized thermo-plastic materials, the container having a restricted neck portion, an enlarged body portion, and a flaring joining portion, the steps of simultaneously injection molding said neck portion and a tapered portion contiguous therewith, only partially chilling said tapered portion, extruding into the open air a tubular formation integral with said tapered portion and of larger diameter than said neck portion, and expanding both said partially chilled tapered portion and said tubular portion to form the final container, said tapered portion, when blown, forming at least a portion of said flaring joining portion.

7. In a method of making an article of heated and plasticized thermoplastic material, the steps of simultaneously injection molding from plasticized material a finished portion of said article and a transitory portion immediately adjacent said finished portion, partially chilling both said finished portion and said transitory portion, terminating the chilling of the transitory portion only prior to its being finally set, extruding a tubular extension integral with said transitory portion, enclosing the transitory portion and said tubular portion only in a final mold, and forming both said transitory portion and said tubular portion to their final form by chilling in said final mold.

8. In a method of making a plastic article from heated thermoplastic material by injection molding a finished article portion, extruding a tube integral with the finished portion, and blowing the tube to its final configuration, the improvements accommodating the extrusion of a tube of a diameter substantially differing from the diameter of said finished portion comprising the step of spacing the finished portion mold axially from said orifice, interposing between said orifice and said finished portion mold a second annular injection mold, injection molding an annular joining portion in said second injection mold concurrently with the injection molding of said finished portion, only partially curing said joining portion in said second injection mold, removing said joining portion from said second injection mold, extruding a tube integral with said joining portion, and enclosing the joining portion and said tube in a blow mold for expansion therein to final form.

9. In a method of making a plastic article from heated and plasticized thermoplastic material by the injection molding of a finished portion of the article, forming a tubular extension integral with the finished portion and blowing the tubular extension to final shape in an enclosing blow mold, the steps of injection molding a transitory portion of the article intermediate the finished portion and the tubular extension prior to formation of the tubular extension, only partly chilling said transitory portion prior to blowing of the tubular portion, and subsequently blowing the transitory portion to its final configuration in the blow mold.

References Cited in the file of this patent

UNITED STATES PATENTS

| | | |
|---|---|---|
| 2,562,523 | Brunet | July 31, 1951 |
| 2,710,987 | Sherman | June 21, 1955 |
| 2,804,654 | Sherman | Sept. 3, 1957 |
| 2,878,520 | Mumford et al. | Mar. 24, 1959 |

FOREIGN PATENTS

| | | |
|---|---|---|
| 692,590 | Great Britain | June 10, 1953 |